United States Patent [19]

Harry et al.

[11] Patent Number: 4,601,869

[45] Date of Patent: Jul. 22, 1986

[54] BLOW MOLDING METHOD EMPLOYING A MOLD CLAMP ASSEMBLY

[75] Inventors: Ieuan L. Harry; Suppayan M. Krihsnakumar, both of Nashua; Walter R. Jolly, Merrimack; Martin H. Beck, Brookline, all of N.H.

[73] Assignee: The Continental Group, Inc., Stamford, Conn.

[21] Appl. No.: 420,056

[22] Filed: Sep. 20, 1982

Related U.S. Application Data

[62] Division of Ser. No. 244,469, Mar. 16, 1981, Pat. No. 4,365,950.

[51] Int. Cl.$^4$ ............... B29C 49/32; B29C 49/64
[52] U.S. Cl. ................................. 264/523; 264/535
[58] Field of Search ............ 425/526, 534, 541, 535, 425/450.1, 451.9; 264/523, 535, 537, 538

[56] References Cited

U.S. PATENT DOCUMENTS

| | | | |
|---|---|---|---|
| 3,063,092 | 11/1962 | Fischer | 425/541 X |
| 3,069,722 | 12/1962 | Kato | 425/541 X |
| 3,078,508 | 2/1963 | Martin, Jr. | 425/541 X |
| 3,339,230 | 9/1967 | Farrell | 425/534 X |
| 3,880,565 | 4/1975 | Barr et al. | 425/450.1 X |
| 4,285,658 | 8/1981 | Bohart et al. | 425/541 X |

*Primary Examiner*—Jan Silbaugh
*Attorney, Agent, or Firm*—Charles E. Brown

[57] ABSTRACT

A method for blow molding from preforms hollow articles, particularly beverage bottles, at a high production rate. The method incorporates a clamp assembly which receives therein carriers containing a number of preforms arranged in a line and wherein there are two mold units, one on each side of a central longitudinally elongated clamp member which is mounted for transverse reciprocatory movement. When the clamp member is positioned to close one mold unit, it operates to open the other mold unit so that while preforms in the closed mold unit are being blow molded, the other mold unit is open and may have the carrier supporting previously blow molded articles displaced therefrom and replaced by a carrier containing a new set of preforms whereby, when the blow molding operation of the one mold unit is completed, the other mold unit is ready for closing and a blow molding operation. This abstract forms no part of the specification of this application and is not to be construed as limiting the claims of the application.

1 Claim, 3 Drawing Figures

BLOW MOLDING METHOD EMPLOYING A MOLD CLAMP ASSEMBLY

This is a division of Ser. No. 244,469, filed Mar. 16, 1981, now U.S. Pat. No. 4,365,950.

This invention relates in general to blow molding apparatus, and more particularly to a clamp assembly including a pair of mold units wherein, while one set of mold units is operative to blow mold preforms in accordance with the cavity configuration of the molds, the other mold unit is open, permitting the removal of previously blow molded articles and the positioning therein of additional preforms.

This invention particularly relates to a clamp assembly for the high speed production of blow molded articles, preferably bottles, from preforms.

The invention particularly relates to a clamp assembly which includes two mold units mounted within a frame and separated by a reciprocating clamp member. Each mold unit is a plural cavity construction with the cavities being in longitudinally adjacent relation and each mold unit including at least two mold halves of a split arrangement. Remote mold halves of the two mold units are fixed relative to the frame while adjacent mold halves of the two mold units are carried by the clamp member. The clamp member has two operating positions between which it periodically moves. In one operating position, the clamp member effects the closing of one mold unit while opening the other mold unit. In the second position, the clamp member closes the other mold unit and opens the one mold unit.

In accordance with this invention, while one mold unit is closed and preforms positioned therein are being blow molded, articles previously blow molded in the other mold unit are transferred out of the clamp assembly and are replaced by a new set of preforms. Thus, when the blow molding operation in one mold unit is completed, the other mold unit has been cleared of blow molded articles and has positioned for reception therein the new set of preforms.

A particular advantage of the clamp assembly is that a large number of preforms may be simultaneously blow molded, the number presently envisioned being on the order to twelve to sixteen preforms arranged in a single line.

Another feature of the invention is forming the clamp member in the shape of an I-beam having upper and lower flanges and wherein the necessary inflation equipment for the two mold units is carried by one set of flanges and, in the event the mold construction of each mold unit is of the type having a bottom or end mold portion which must be moved longitudinally of the mold cavity, the necessary apparatus for supporting and positioning such mold portion may be mounted on the other flanges.

In accordance with this invention, the preforms are carried by carriers and are transported by way of a feed system through an oven to effect the required heating of the preforms before the preforms are introduced into the clamp assembly.

With the above and other objects in view that will hereinafter appear, the nature of the invention will be more clearly understood by reference to the following detailed description, the appended claims, and the several views illustrated in the accompanying drawings.

IN THE DRAWINGS

FIG. 3 is a longitudinal vertical sectional view taken generally along the line 3—3 of FIG. 2 with parts broken away and shown in section, and shows further the details of the clamp assembly.

Figure 1:
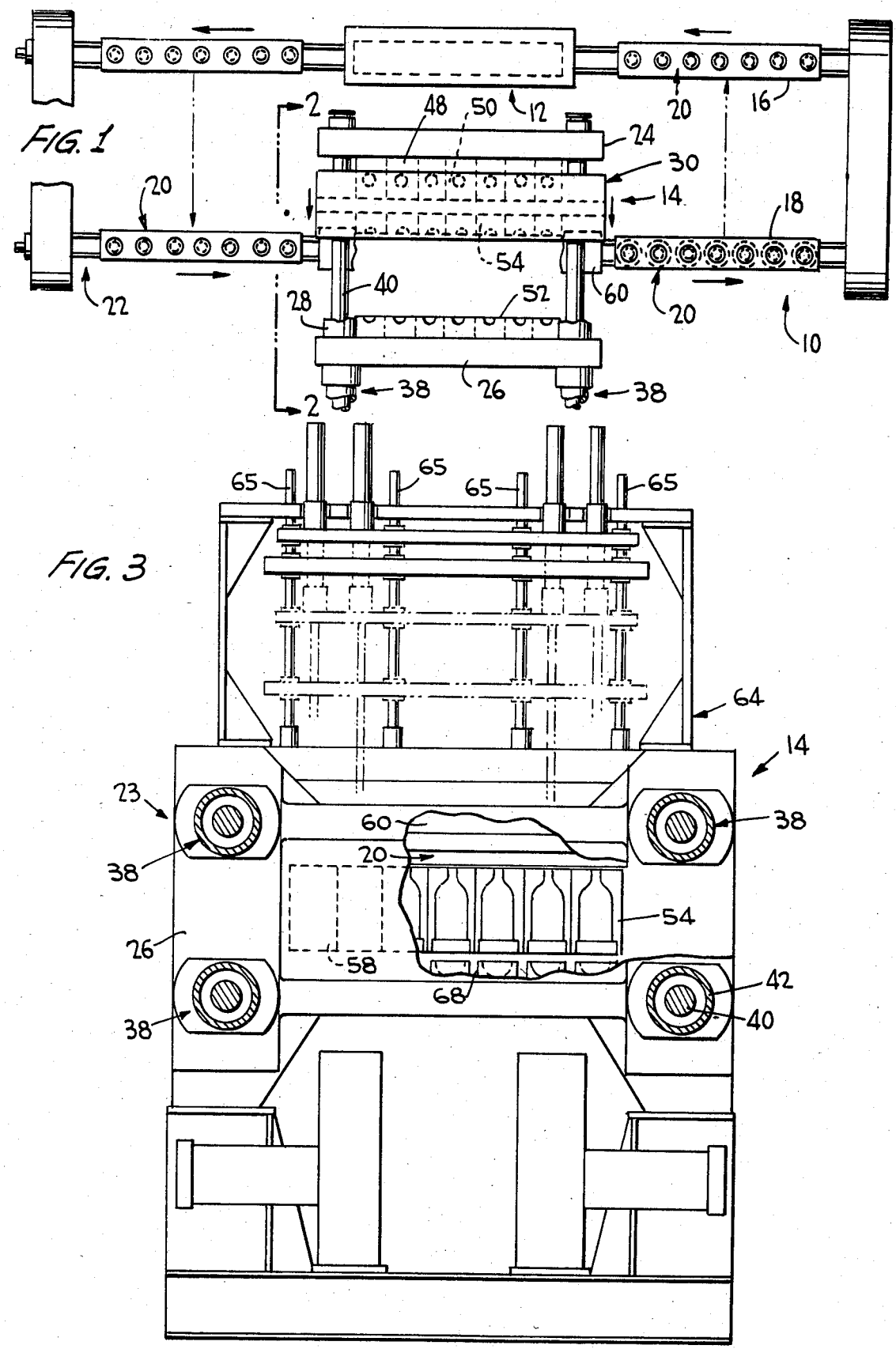
FIG. 1 is a plan view of a blow molding apparatus incorporating the clamp assembly of this invention.

Referring now to the drawings in detail, it will be seen that there is illustrated in FIG. 1 a blow molding apparatus in accordance with this invention, the apparatus being generally identified by the numeral 10. The illustrated apparatus is of a plural station type and includes an oven 12 and a clamp assembly 14. Preforms which are to be blow molded are transferred between a loading station 16, through the oven 12 and through the clamp assembly 14 to a discharge station 18 by way of carriers 20. Suitable track means for controlling the movement of the carriers 20 has been schematically illustrated and is identified by the numeral 22.

In accordance with this invention, an empty carrier 20 is loaded with preforms P at the station 16 and then is moved into and through the oven 12. The carrier 20 containing the heatd preforms is then shifted to another portion of the track 22 for movement into the clamp assembly 14 and within the clamp assembly 14 the preforms P are blow molded to the desired configuration, preferably in the form of bottles. The blow molded articles, still carried by the carrier 20, are directed to the discharge station 18 where the blow molded articles are discharged. The empty carrier 20 is then shifted to the preform loading station 16.

It is to be understood that the specific relationship of the various stations and the oven 12 and the clamp assembly 14 illustrated in FIG. 1 may be readily varied to provide for maximum output without departing from the spirit and scope of the invention. What is required is that uniformly heated preforms be directed into the clamp assembly 14 ready to be blow molded within blow molds forming part of the clamp assembly 14.

Figure 2:
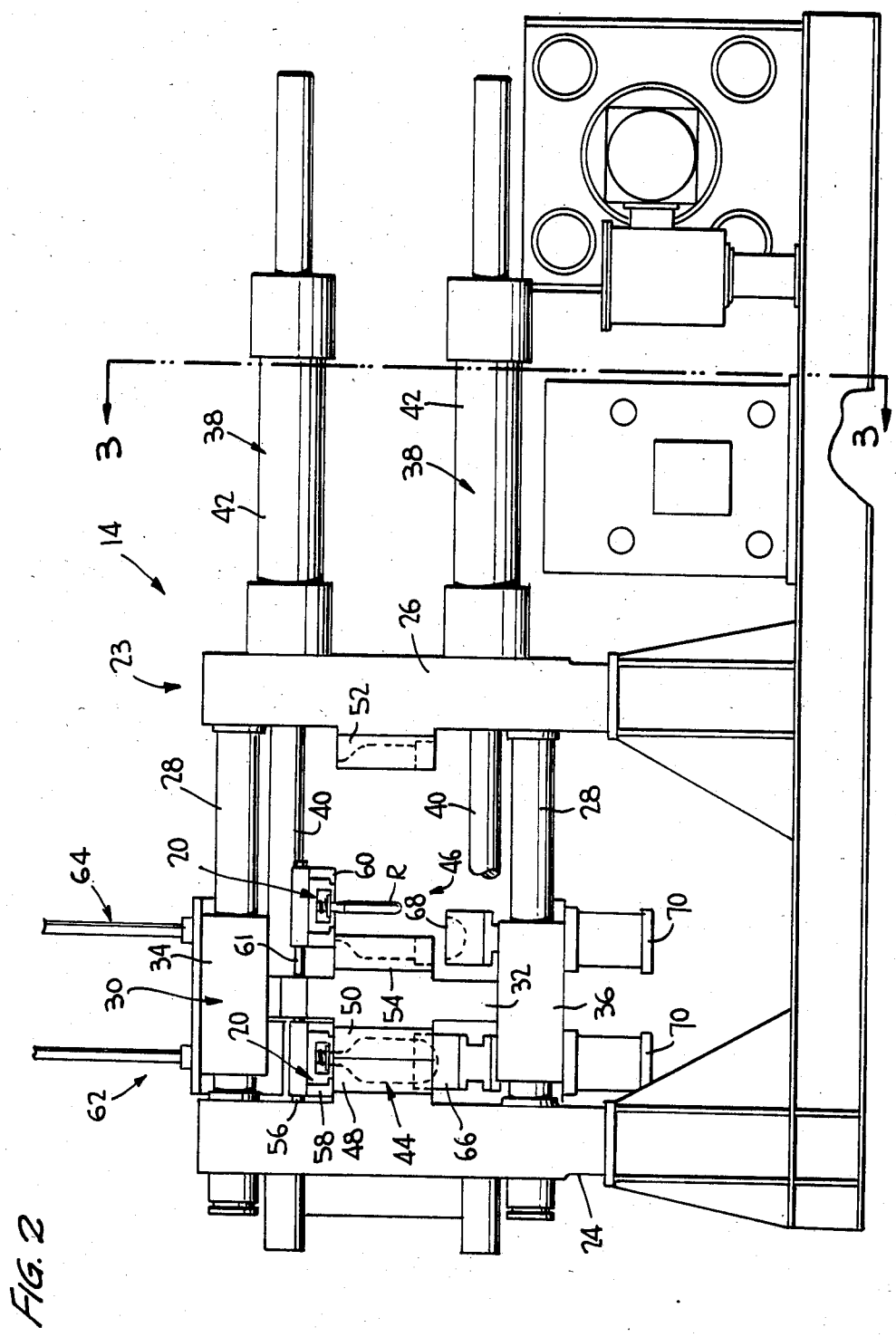
FIG. 2 is an enlarged transverse vertical sectional view taken generally along the line 2—2 of FIG. 1, and shows specifically the details of the clamp assembly.

Referring now to FIG. 2, it will be seen that the clamp assemby 14 includes a frame generally indentified by the numeral 23. The frame 23 includes a pair of end members 24, 26 which are transversely spaced and connected together by guide rods 28 which are preferably four in number and which are arranged in a rectangular pattern when viewed in longitudinal section. There is mounted on the guide rods 28 for transverse reciprocating movement a clamp member generally identified by the numeral 30. The clamp member 30 is of an I-section and may be considered to be an I-beam. This is clearly illustrated in FIG. 2.

The clamp member 30 may thus be described as including a longitudinally elongated vertical web 32 and upper and lower flanges 34, 36. The flanges 34, 36 have extending therethrough the guide rods 28 and serve to mount the clamp member 30 for controlled transverse sliding movement.

In order to provide for the transverse reciprocatory movement of the clamp member 30, there is carried by the end member 26 extensible fluid motors 38 which, as is best shown in FIG. 3, are also mounted in a rectangular pattern. The fluid motors 38 include piston rods 40 which extend through opposite ends of respective cylinders 42 and through the end members 24, 26. The clamp member 30 is suitably fixed to the piston rods 40 for movement by the extensible fluid members or motors 38 in a transverse direction as determined by the guide rods 28.

The clamp assembly 14 also includes two mold units 44,46 which are positioned on opposite sides of the clamp member 30. The mold unit 44 is of a vertically split configuration and includes a fixed mold half 48 which is secured to the side member 24 and a movable mold half 50 which is carried by the clamp member 30. At this time it is pointed out that the mold unit 44 is of a plural cavity mold unit with the cavities being in longitudinally adjacent relation and the cavities being on the order of twelve to sixteen in number although, in the illustrated embodiment of the invention for illustrative purposes only, the apparatus is intended to handle and simultaneously to blow mold only seven preforms.

The mold unit 46 is similar to the mold unit 44 and includes a fixed mold half 52 which is secured to the side member 26 and a movable mold half 54 which is carried by the clamp member 30.

On one side of the clamp member 30 there is mounted on a suitable transverse support 56 a carrier support 58 for transverse movement both together with the clamp member 30 and relative thereto. A similar carrier support 60 is mounted on the opposite side of the clamp member 30 on a transverse support 61. Each of the carrier supports 58, 60 is of a cross section to have telescoped therein one of the carriers 20, as is shown in FIG. 2.

In order that preforms P carried by a carrier 20 and clamped within one of the mold units 44, 46 may be blow molded under the influence of internal gaseous pressure, there is carried by the flange 34 and the clamp member 30 two sets of inflation apparatus 62, 64. The inflation apparatus 62 is fixedly positioned in a transverse direction relative to the mold half 50 of the mold unit 44 while the inflation unit 64 is fixedly positioned relative to the mold half 54 of the mold unit 46. It is to be understood that each inflation unit 62, 64 will include an inflation element for each mold of the respective mold unit. Each inflation element 65 will be of a generally conventional construction and includes means for forming a seal with the interior of the mouth of the preform P and means for introducing a blowing gas into the preform. Further, each inflation element may include a suitable guide rod or like device for assuring the continued centering of the preform within its respective blow mold.

In the event the mold units 44, 46 shall be of the type requiring a separate bottom portion 66, 68, the bottom portions will be carried by the lower flange 36 of the clamp member 30. The mounting of the mold bottom portions 66, 68 is illustrated as being by way of a extensible fluid motor 70 carried by the flange 36. It is to be understood that other modes of mounting the mold bottom portions may be utilized.

OPERATION

In the operation of the invention, previously formed preforms at ambient temperature are loaded into a carrier 20 at the loading station 16 and then moved through the oven 12 where the preforms are heated to the required temperature. The heated preforms are then transferred along the track 22 and into the clamp assembly 14. When a carrier 20 is pushed into the clamp assembly 14, it displaces a like carrier previously positioned within the clamp assembly. With reference to FIG. 2, it will be seen that when the clamp assembly is in the position where the mold unit 44 is closed, the mold unit 46 is open. Thus, a preselected number of preforms, as determined by the carrier 20, may be pushed into the carrier support 60 for blow molding within the mold unit 46.

With the preforms P so positioned within the clamp assembly, the fluid motors 38 are actuated to shift the clamp member 30 to the right. As the clamp member 30 moves to the right, it moves with it the carrier support 60 until the carrier support 60 is positioned relative o the mold half 52, after which the mold half 54 closes relative to the mold half 52. At this time, the clamp assembly 14 is in position for (1) blow molding the preforms positioned within the mold unit 46, (2) removing the previously molded articles (bottles) from the mold unit 44, and (3) receiving a new set of preforms within the mold unit 44.

After the preforms P within the mold unit 46 have been blow molded, the clamp member 30 is now movable back to the left, closing the mold unit 44 on the newly positioned preforms while opening the mold unit 46 and aligning the carrier support 60 with the track 22 for receiving a next carrier and the preforms suspended therefrom.

It is to be understood that an automatic controller may be utilized for the actuation of the clamp assembly 14 in timed relation to the actuation of the feed mechanism for the carriers.

Although only a preferred embodiment of the clamp assembly has been specifically illustrated and described herein, it is to be understood that minor variations may be made in the clamp assembly and the feed apparatus for supplying carriers thereto without departing from the spirit and scope of the invention as defined by the appended claims.

We claim:

1. A method of blow molding at one time a plurality of preforms, said method comprising the steps of providing heated preforms in carriers, using the carriers positioning a selected plurality of the heated preforms in one mold unit of a two mold unit clamp assembly, transversely closing the one mold unit on the selected heated preforms and shifting the one mold unit transversely to one side while simultaneously opening the other mold unit and positioning the other mold unit for discharging blow molded articles and receiving a new supply of preforms, while discharging blow molded articles and receiving a new supply of preforms in the other mold unit, blow molding the heated preforms in the one mold unit, and then repeating the step with the other mold unit being closed and the one mold unit being opened, each mold unit having associated therewith a carrier support, each carrier support being moved relative to a respective mold unit during the opening and closing of the mold unit, and each carrier support being automatically moved to a carrier receiving-discharging position when the respective mold unit is fully open.

* * * * *